United States Patent [19]
Machek

[11] 3,710,896
[45] Jan. 16, 1973

[54] ANTI-RATTLE DEVICE FOR A DISC BRAKE

[75] Inventor: John A. Machek, Creve Coeur, Mo.

[73] Assignee: Wagner Electric Corporation, Newark, N.J.

[22] Filed: Nov. 9, 1970

[21] Appl. No.: 87,973

[52] U.S. Cl............................188/73.5, 188/73.4
[51] Int. Cl...........................................F16d 55/224
[58] Field of Search........188/73.5, 73.4, 72.4, 205 A

[56] References Cited

UNITED STATES PATENTS

| 3,536,166 | 10/1970 | Falk | 188/73.4 |
| 3,199,632 | 8/1965 | Chouings | 188/73.4 |
| 3,493,084 | 2/1970 | Maurice | 188/73.4 X |
| 3,545,576 | 12/1970 | Sahs | 188/73.5 |
| 3,612,226 | 10/1972 | Pauwels et al. | 188/73.3 |

FOREIGN PATENTS OR APPLICATIONS

| 1,927,459 | 5/1970 | Germany | 188/73.5 |
| 86,075 | 10/1965 | France | 188/73.5 |

Primary Examiner—George E. A. Halvosa
Attorney—Joseph E. Papin

[57] ABSTRACT

An anti-rattle or biasing member is biased between the caliper and the inboard and outboard brake shoes of a caliper type disc brake respectively urging said caliper and brake shoes toward anti-rattling engagement with the brake support member which defines a closed loop substantially about the disc of said brake.

9 Claims, 4 Drawing Figures

PATENTED JAN 16 1973   3,710,896

INVENTOR:
JOHN A. MACHEK
BY Joseph E. Papin

ANTI-RATTLE DEVICE FOR A DISC BRAKE

BACKGROUND OF THE INVENTION

1. Field Of The Invention

This invention relates in general to disc brakes and in particular to anti-rattle means therefor.

2. Description Of The Prior Art

In the past, anti-rattle devices were utilized having a pivotal lever which was spring loaded to urge the disc brake caliper or loop member toward engagement with the brake support, and other anti-rattle devices included resilient means biased between the disc brake caliper and shoes urging said shoes toward their anchors. One of the undesirable or disadvantageous features of such past anti-rattle devices was that they were removably secured to the brake by removable means, and in order to remove or insert the brake shoes into the disc brake, it was necessary to disassemble the anti-rattling devices from the disc brake. Another disadvantageous or undesirable feature of some of the past anti-rattle devices was that they transmitted unequal loading to the brake shoes when said brake shoes were worn due to frictional engagement. Still another disadvantageous or undesirable feature of some past anti-rattle devices was that the load thereof, while sufficient to urge the shoes into anti-rattle engagement with the disc brake support plate, was insufficient to also urge the caliper into anti-rattle engagement with said support plate due to the rather heavy weight of said caliper

RELATED PATENTS

This patent application is related to U.S. Pat. No. 3,536,166 issued Oct. 27, 1970, to Edward J. Falk and assigned to the common assignee of this patent application and is patentably distinct therefrom.

SUMMARY OF THE INVENTION

The principle object of the present invention is to provide an anti-rattle device for a disc brake which overcomes the aforementioned undesirable or disadvantageous features, and this, as well as other objects and advantageous features of the present invention, will become apparent in the specification which follows.

Briefly, the anti-rattle means of the present invention includes resilient means having opposed ends releasably engaged with caliper means adjacent to the opposed sides of the disc of a disc brake, and an intermediate member integrally formed with said resilient means and extending across the disc periphery in engagement with the disc brake shoes, said resilient means urging said shoes and caliper means toward anti-rattling engagement with the disc brake support member. Another aspect of the present invention is that the opposed ends of said resilient means are alternatively removably secured to said brake support member wherein only said brake shoes are urged into anti-rattling engagement therewith. And still another aspect of the present invention is that the intermediate member of said anti-rattle means defines a spring portion for maintaining the forces applied to said brake shoes substantially uniform as the inboard brake shoe is repositioned along said spring portion toward its disc side in response to brake shoe wear.

BRIEF DESCRIPTION OF THE DRAWINGS

In the drawings which illustrate embodiments of the present invention and wherein like numerals refer to like parts wherever they occur.

Figure 1:
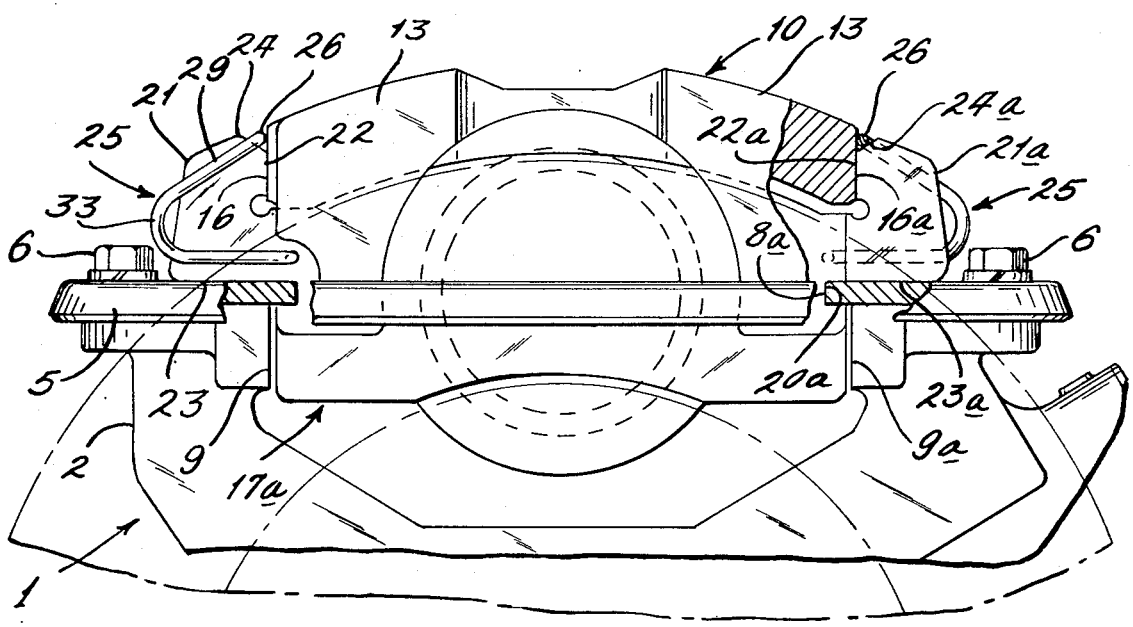
FIG. 1 is an elevational view, partially in cross-section, of a disc brake illustrating the present invention.
Figure 2:
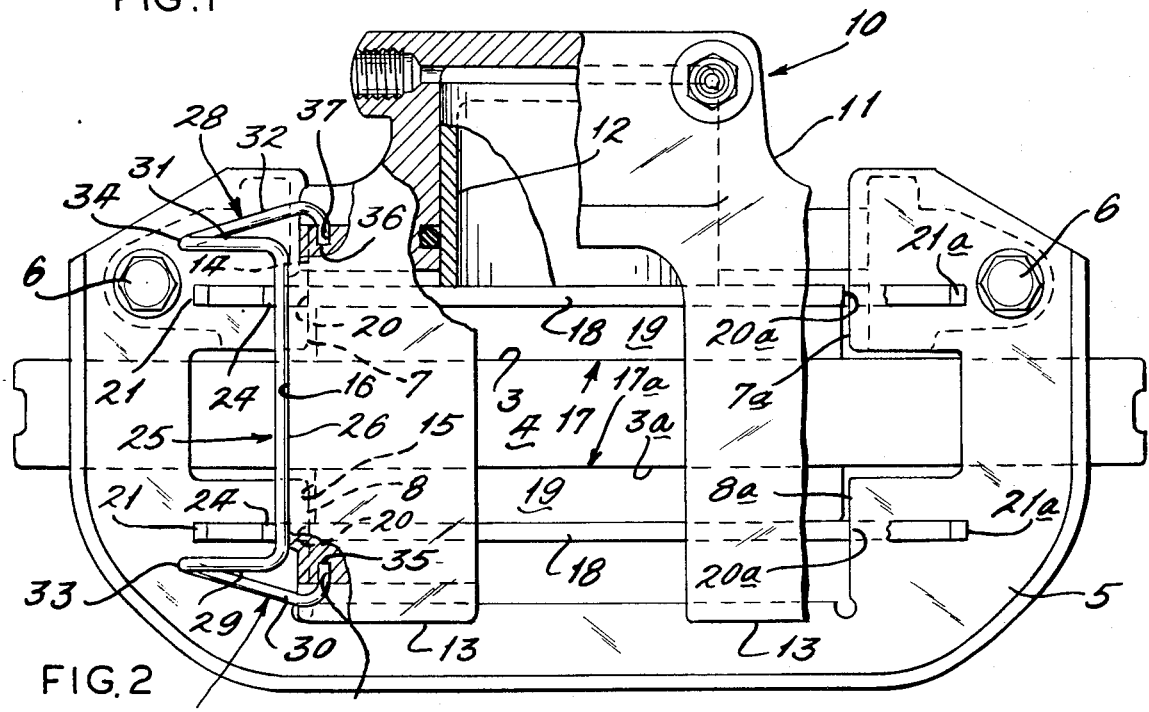
FIG. 2 is a fragmentary plane view, partially in cross-section, of the disc brake of FIG. 1.

Referring now the the drawings in detail and in particular to FIGS. 1 and 2, a friction device or disc brake 1 is provided with a spider or support means 2 for connection with a vehicle structural member, such as a steering knuckle or axle flange (not shown), adjacent to the inboard side 3 of a rotatable disc 4. A support member or plate 5 is connected with the spider 2 by suitable means, such as studs 6, and defines a stationary closed loop substantially about a chordal sector of the disc 4. The loop member 5 is provided with opposed guide edges or anchoring surfaces 7, 7a and 8, 8a in planes substantially normal to the disc 4 and respectively adjacent to the inboard and outboard sides 3, 3a thereof, and opposed anchoring surfaces 9, 9a are also provided on the spider 2 beneath the loop member edges 7, 7a, respectively.

A caliper member, indicated generally at 10, is mounted in straddling relation with respect to the disc 4 having a fluid pressure portion 11 with a fluid pressure responsive piston 12 slidable therein adjacent to the disc inboard side 3 and a bifurcated reaction portion 13 adjacent to the disc outboard side 3a. Opposed grooves 14, 14a and 15, 15a are provided in the pressure and reaction portions 11, 13 in sliding and anchoring engagement with the loop member edges 7, 7a and 8, 8a, and anchor surfaces 16, 16a are provided on the opposed sides of said caliper pressure and reaction portions extending across the peripheral of the disc 4. The caliper pressure portion 11 is positioned in aliding engagement between the spider anchor surfaces 9, 9a in anchoring engagement therewith.

Inboard and outboard friction members or brake shoes 17, 17a are of identical construction and positioned between the caliper pressure and reaction portions 11, 13 for frictional engagement with the disc inboard and outboard sides, respectively. The brake shoes 17, 17a are each provided with a backing plate 18 having a pad of friction material 19 connected therewith and opposed slots or grooves 20, 20a are provided in said backing plates in sliding and anchoring engagement with the loop member edges 7, 7a and 8, 8a, respectively. The brake shoes 17, 17a are also each provided with opposed integral extensions 21, 21a on the backing plates 18 thereof having anchor surfaces 22, 22a in sliding anchoring engagement with the caliper anchor surfaces 16, 16a, and guiding or supporting surfaces 23, 23a are also provided on said extensions in guiding and supporting engagement with the loop member 5, respectively. It should be noted that notches 24, 24a are provided in the upper end of the extensions 21, 21a adjacent to the extensions anchor surfaces 22, 22a defining detents with the caliper anchor surfaces 16, 16a, respectively.

The caliper piston 12 is drivingly engaged with the backing plate 18 of the inboard shoe 17 and responsive to fluid pressure applied thereto from a fluid pressure source (not shown) to urge the friction pad 19 of said inboard shoe into frictional engagement with the disc inboard side 3, and the caliper 10 is slidable on the loop member 5 in response to the applied fluid pressure to urge the reaction portion 13 toward the disc outboard side 3a and concertedly drive the outboard shoe 17a into frictional engagement therewith. Of course, the horizontal component of the braking torque is transferred from the shoes 17, 17a through the extension anchor surfaces 22 to the caliper anchor 16 when the disc 4 is rotating in the forward direction as shown by the directional arrow in FIG. 1, and if there is deflection of the shoe extensions 21 in response to the braking torque, some of the horizontal force is also transmitted to the loop member edges 7a, 8a from the shoe slots 20a; however, the supporting engagement between the extension support surfaces 23 of said brake shoes and the loop member 5 oppose deflection of said extensions, respectively. The vertical component of the braking torque is transferred from the shoes 17, 17a to the loop member 5 through the engagement of the slots 20, 20a in said shoes with the loop member edges 7, 7a and 8, 8a. The twisting component of the braking torque is transmitted from the caliper 10 to the loop member 5 through the engagement of the caliper grooves 14, 14a and 15, 15a with the loop member edges 7, 7a and 8, 8a, and a portion of the twisting component is also transmitted directly to the spider 2 by the engagement of the caliper pressure portion 11 with the anchors 9, 9a thereof, respectively.

Anti-rattle means, such as the opposed retainers or spring members indicated generally at 25, are provided to maintain the caliper 10 and brake shoes 17, 17a engaged with the loop member 5 in order to surpress or prevent noise or rattle in the brake 1 in response to vehicle vibrations and road shocks transmitted thereto. The spring member 25 is preferrably formed from a preselected spring wire having a lengthwise extending intermediate or central portion 26 integrally formed between spaced, resilient substantially U or V-shaped or hair pin-shaped configurations indicated generally at 27, 28. The V-shaped configurations 27, 28 generally comprise a pair of opposed and generally transversely extending arm portions 29, 30 and 31, 32 interconnected by resilient or spring portions 33, 34, and the distal or free ends of the arms 30, 32 are substantially normal thereto to define opposed retaining tabs or inserts 35, 36 which extend generally in the same direction as the intermediate portion 26.

As shown particularly in FIG. 2, opposed bores or drilled holes 37, 37a and 38, 38a are provided in the caliper pressure and reaction portions 13 adjacent to the side edges or anchoring sides thereof, respectively, and the arms 30, 32 of the spring members 25 are extended or deflected manually in the lengthwise direction thereof to insert the retaining tabs 35, 36 into biased or displacement preventing engagement with the caliper holes 37, 38 and 37a, 38a, respectively. The spring members 25 are also deflected by moving the arms 29, 31 away from the arms 30, 32 which stresses the spring portions 33, 34 in order to snap the intermediate portion 26 over the ears 21, 21a of the inboard and outboard shoes 17, 17a into resilient gripping engagement with the notches 24, 24a thereof and into abutment with the caliper anchor surfaces 22, 22a, respectively. In this manner, the stressing of the resilient V-shaped portions 27, 28 of the spring members 25 urges the support surfaces 23, 23a of the inboard and outboard shoes 17, 17a in one direction into anti-rattling or abutting engagement with the loop member 5 and also urges the caliper member 10 in the other direction to maintain the grooves 14, 14a and 15, 15a of the pressure and reaction portions 11, 13 in anti-rattling or abutting engagement with the loop member edges 7, 7a and 8, 8a, respectively.

Figures 3, 4:
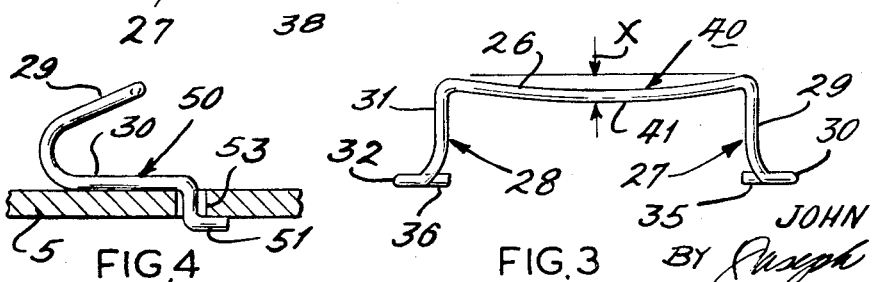
FIG. 3 is an elevational view illustrating another embodiment of the anti-rattle means of the present invention for use in the disc brake of FIG. 1.
FIG. 4 is a partial elevational view of the disc brake of FIG. 1, partially in cross-section, illustrating another embodiment of the present invention.

Referring now to FIG. 3, another anti-rattle means or spring member 40 is shown for use in combination with the disc brake 1 having substantially the same component parts and functioning in substantially the same manner as the spring member 25 with the following exceptions. The intermediate member 26 of the spring member 40 is provided with a spring or deflected portion 41 in the form of an arc between the hair pin-shaped configurations 27, 28. The degree of bend or permanent spring deflection of the spring portion 41, as shown at X, is determined by the spring wire diameter, the length of the intermediate member 26 between the hair pin-shaped configuration 27, 28, and the final reposition or adjusted position of the brake shoe 17 with respect to the opposed disc sides 3 in response to the wear of its friction pad 19 occasioned upon repeated frictional engagement with said disc opposed sides. The spring portion 41 provides a greater uniformity in the biasing force it applies to the inboard shoe 17 as it is repositioned along the spring portion 41 of the intermediate member 26 toward its cooperative disc side 3 upon brake shoe wear in comparison to the biasing force said spring portion applies to the outboard shoe 17a.

Referring now to FIG. 4, another anti-rattle means or spring member 50 is shown in combination with the disc brake 1 having substantially the same component parts and functioning in substantially the same manner as the previously described spring members 25, 40 with the following exceptions. The arms 30, 32 are provided with integral distal or free ends 51, 52 which are bent or formed generally in an L-shape and are in substantially the same plane as said arms, respectively. The L-shaped ends 51, 52 extend through apertures 53 which are provided in the loop member 5 adjacent to the inboard and outboard sides thereof and the caliper pressure and reaction portions 11, 13, respectively; however, for the sake of simplicity, only one L-shaped end and loop member aperture for the spring members 50 is shown in FIG. 4. The L-shaped ends 51, 52 are releasably positioned through the apertures 53 and define connections therewith which permit the compressive force of the spring member 50 to urge the supporting surfaces 23, 23a of the brake shoes 17, 17a into anti-rattling abutment with the loop member 5.

From the foregoing, it is now apparent that an anti-rattle means 25, 40, 50 is utilized in combination with a disc brake 1 meeting the objects and advantageous features set forth hereinabove, as well as other objects and advantageous features, are provided and that changes as to the precise configuration, shape or other detail of the construction set forth in the disclosure by way of illustration may be made by those skilled in the art without departing from the spirit of the invention.

The embodiments of the invention in which an exclusive property or privilege is claimed are defined as follows:

1. In a friction device for use with a rotatable disc having support means defining a closed loop substantially about a chordal sector of said disc, a pair of brake shoes for frictional engagement with the opposed sides of said disc, caliper means axially movable on said support means and straddling at least a portion of said disc including a fluid pressure portion and a reaction portion adjacent said disc opposed sides and drivingly engaged with said brake shoes to effect the frictional engagement thereof with said disc opposed sides, respectively, and anti-rattle means comprising at least one spring member having a central body portion, a pair of spaced arms each having one end integrally connected to the central body portion at opposite ends thereof to extend out transversely from said central body portion, said arms being bent backwardly toward themselves to extend in toward said central body portion to form a resilient spring at the bend, attachment means connected at a second end of each of said arms in position spaced away from said bend and in the direction of said central body portion, each of said attachment means being releasably connected directly to at least one of said caliper means and loop member at spaced points in a displacement preventing engagement with at least one of said caliper means and loop member and said central body portion being engaged to bear against an end portion of said brake shoes in position to bias the resilient spring of the arms to urge at least one of said caliper means and brake shoes toward anti-rattle abutment with said loop member.

2. In a friction device for use with a rotatable disc, support means mounted adjacent to one of the opposed sides of said disc including a member defining a closed loop about substantially a chordal sector of said disc, a pair of friction members for frictional engagement with said disc opposed sides, respectively, caliper means axially movable on said loop member and straddling at least a portion of the disc periphery including a fluid motor portion and a reaction portion respectively adjacent to said disc opposed sides and engaged with said friction members to effect axial movement thereof into frictional engagement with said disc opposed sides upon actuation of said fluid motor portions, respectively, a first pair of opposed anchor means on said fluid motor portion, a second pair of opposed anchor means on said reaction portion, said first and second pairs of anchor means extending in planes substantially normal to said disc sides plane, respectively, said friction members each including a backing plate having a central portion interposed between opposed end portions, friction material supported on said backing plate adjacent to said central portion and adapted for frictional engagement with said disc opposed sides, a pair of extension means on said backing plate integrally connected with said opposed end portions, said pair of extension means on the backing plate of one of said friction members embracing said first pair of anchor means and said pair of extension means on the backing plate of the other of said friction members embracing said second pair of anchor means, respectively, leading and trailing anchor surfaces on said extension means of said one and other friction members in facing relation and extending in planes substantially normal to said backing plates thereof, said leading anchor surfaces of said one and other friction members being engaged in brake torque transfer relation with one anchor means of said first and second anchor means pairs, wherein said leading anchor surfaces are urged into anchoring engagement with one anchor means of said first and second anchor means pairs to transfer thereto brake torque in the direction of disc rotation, a pair of supporting surfaces on said extension means of said one and other friction members substantially normal to the planes of said backing plate and said leading and trailing anchor surfaces thereof and in sliding and abutting engagement with said loop member, respectively, one of said supporting surfaces of said one and other friction members being urged into abutting engagement with said loop member to establish a reaction force supporting one of said extension means of said one and other friction members against deflection in response to the brake torque acting on said leading anchor surfaces thereof, and a pair of notches in said extension means of said one and other friction members adjacent to said leading and trailing anchor surfaces thereof, respectively, and anti-rattle means comprising a pair of spring means, each of said spring means including an intermediate member extending in a generally axial direction across the disc periphery and engaged with said notches in the adjacent opposed extensions of said one and other friction members and also engaged with said one and the other of said anchor means of said first and second anchor means pairs, a pair of spaced arms integral with said intermediate members and adjacent to the adjacent opposed extensions of said one and other friction members and said caliper pressure and reaction portions, said arms being generally normal to said intermediate member and extending away from said one and other anchor means of said first and second anchor means pairs, a pair of resilient portions integral with said arms and having a generally U-shaped configuration, another pair of arms integral with said resilient portions and extending generally transversely with said first named pair of arms toward said caliper fluid motor and reaction portions, and a pair of tab means on said other pair of arms defining the free ends thereof and extending generally in the same direction as said intermediate member, respectively, and said caliper fluid motor and reaction portions respectively including means receiving said tab means in displacement preventing engagement therewith, said intermediate member urging said support surfaces of said one and other friction members in one direction into anti-rattling abutment with said loop member and said tab means urging said caliper fluid motor and reaction portions in another direction opposite to said one direction into anti-rattling abutment with said loop member in response to the inherent compressive force of said resilient portions, respectively.

3. In a friction device for use with a rotatable disc having support means defining a closed loop substantially about a chordal sector of said disc, a pair of brake shoes for frictional engagement with the opposed sides of said disc, caliper means axially movable on said support means and straddling at least a portion of said disc including a fluid pressure portion and a reaction portion adjacent said disc opposed sides and drivingly engaged with said brake shoes to effect the frictional engagement thereof with said disc opposed sides, respectively, and anti-rattle means comprising at least one spring member having a central body portion, a pair of spaced arms each having one end integrally connected to the central body portion at opposite ends thereof to extend out transversely from said central body portion, said arms being bent backwardly toward themselves to extend in toward said central body portion to form a resilient spring at the bend, attachment means connected at a second end of each of said arms in position spaced away from said bend and in the direction of said central body portion, each of said attachment means being releasably connected to said caliper means at spaced points in a displacement preventing engagement with said caliper means and said central body portion being engaged to bear against an end portion of said brake shoes in position to bias the resilient spring of the arms to urge said brake shoes and caliper means in opposite directions and into anti-rattle abutment with said loop member.

4. In a disc brake having support means including a member defining a closed loop substantially about a chordal sector of said disc, a pair of brake shoes for frictional engagement with opposed sides of said disc including opposed extension means slidable on said loop member, respectively, caliper means movable on said loop member and straddling at least a portion of said disc including a fluid pressure portion and a reaction portion adjacent said disc opposed sides and drivingly engaged with said brake shoes to effect substantially concerted movement thereof into frictional engagement with said disc opposed sides upon fluid pressure actuation of said caliper means, respectively, and anti-rattle means comprising at least one spring member having a central body portion, a pair of spaced arms each having one end integrally connected to the central body portion at opposite ends thereof to extend out transversely from said central body portion, said arms being bent backwardly toward themselves to extend in toward said central body portion to form a resilient spring at the bend, attachment means connected at a second end of each of said arms in position spaced away from said bend and in the direction of said central body portion, each of said attachment means being releasably connected directly to said loop member at spaced points in a displacement preventing engagement with said loop member and said central body portion being engaged to bear against the adjacent opposed extension means of said brake shoes in position to bias the resilient spring of the arms to urge said adjacent opposed extension means of said brake shoes into anti-rattling abutment with said loop member.

5. In a disc brake according to claim 4, wherein said central body portion includes a spring portion between said pair of spaced arms which is biased into engagement with said adjacent opposed extension means to transmit thereto substantially uniform biasing forces as the inboard one of said brake shoes is repositioned along said spring portion in a direction toward its disc opposed side in response to brake shoe wear.

6. In a disc brake having support means including a member defining a closed loop substantially about a chordal sector of said disc, a pair of brake shoes for frictional engagement with the opposed sides of said disc including opposed ends slidable on said loop member, respectively, caliper means movable on said loop member and straddling at least a portion of said disc including a fluid pressure portion and a reaction portion adjacent said disc opposed sides and drivingly engaged with said brake shoes to effect substantially concerted movement thereof into frictional engagement with said disc opposed sides upon fluid pressure actuation of said caliper means, respectively, and anti-rattle means comprising at least one spring member having a central body portion, a pair of spaced arms each having one end integrally connected to the central body portion at opposite ends thereof to extend out transversely from said central body portion, said arms being bent backwardly toward themselves to extend in toward said central body portion to form a resilient spring at the bend, attachment means connected at a second end of each of said arms in position spaced away from said bend and in the direction of said central body portion, each of said attachment means being connected to at least one of said caliper means and brake shoes and said central body portion being engaged to bear against at least one of said caliper means and the adjacent opposed ends of said brake shoes in position to bias the resilient spring of the arms and urge said brake shoes and caliper member in opposite directions and into anti-rattle engagement with said loop member, respectively.

7. In a disc brake according to claim 6 wherein the said attachment means are connected to the caliper means at spaced points which separate the arms relative to the length of said central body portion to provide a bias between the attachment means and a displacement preventing engagement with said caliper means.

8. In a disc brake according to claim 6, wherein said central body portion extends across the periphery of said disc and is engaged with the adjacent opposed ends of said brake shoes, respectively.

9. In a disc brake according to claim 8, wherein said central body portion is permanently deflected in a direction toward biasing engagement with said brake shoes.

* * * * *